Dec. 21, 1954     F. H. KRANTZ     2,697,791
CONVERTER STABILIZING SYSTEM
Filed Sept. 4, 1952     2 Sheets-Sheet 2

INVENTOR.
FREDERICK H. KRANTZ
BY
Woolcock and Phelan
ATTORNEYS

United States Patent Office 2,697,791
Patented Dec. 21, 1954

2,697,791
CONVERTER STABILIZING SYSTEM

Frederick H. Krantz, Philadelphia, Pa., assignor to Leeds and Northrup Company, Philadelphia, Pa., a corporation of Pennsylvania Application September 4, 1952, Serial No. 307,867

13 Claims. (Cl. 307—132)

This invention relates to vibrators of the type designed to operate at a predetermined number of cycles per second and has for an object the elimination of instability in the timing of one or more contacts as a result of change in amplitude of the driving potential.

Vibrators or devices for making and breaking electrical circuits have been used both to transform direct current into alternating current to avoid the problems inherent in direct-current amplification and for rectification of the amplified output for the operation of a direct-current measuring instrument. Conventional driving circuits for vibrators or circuit breakers of the foregoing type, while satisfactory for a wide variety of measuring applications and for operations with instruments of the type shown in Williams Patent No. 2,113,164, leave something to be desired in obtaining stabilized operation. It has been found that with change in energization of the driving coil of a conventional vibrator system, there is introduced a phase shift or change in the timing of the vibrator contacts; that is to say, the time of closure and the time of opening of the circuit-controlling contacts varies with change in amplitude of the alternating current supplying the driving energy for the vibrator.

In carrying out the present invention, vibrators are operated free of phase shift and with uniform time of closure and of time of opening of their current-controlling contacts, notwithstanding wide changes in amplitude of the alternating current which determines their frequency of operation. More particularly, there is provided a regulated source of direct current from which pulses of constant amplitude are produced at a rate determined by the periodicity of an alternating-current source of supply. The pulses of current of uniform magnitude are converted to alternating current to drive the vibrator. The effect of any change in amplitude of the alternating current is eliminated by employing "clipping circuits"; that is to say, by utilizing but a small fraction of the amplitude of each half-wave of alternating current, and such small fraction thereof that any change in amplitude has a wholly negligible effect upon the operation of the vibrator.

Figure 1:
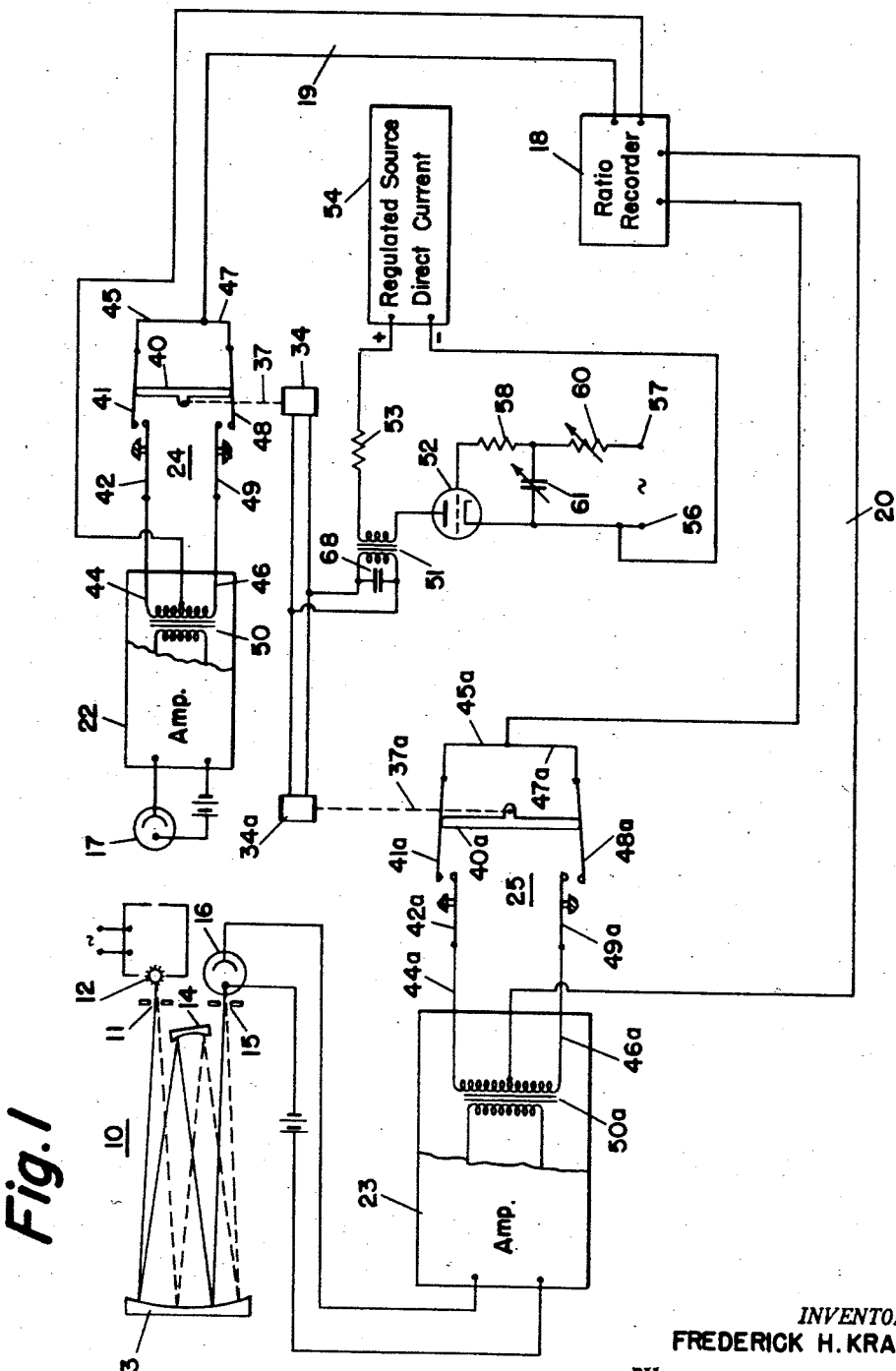
Figure 2:
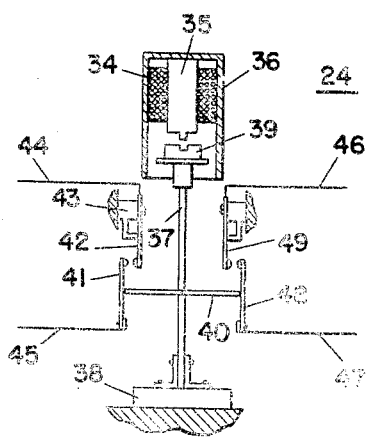

For further objects and advantages of the invention reference is to be had to the following detailed description and to the accompanying drawings, in which:

Fig. 1 diagrammatically illustrates the invention in one form;

Fig. 2 diagrammatically illustrates a vibrator of the type diagrammatically shown in Fig. 1; and Figs. 3–8 are graphs useful in understanding the problems arising in certain measuring systems and the manner in which the present invention avoids the difficulties heretofore encountered in the operation of vibrators.

Referring to the drawings, the invention in one form has been shown as applied to a measuring system of the type disclosed in co-pending application Serial No. 157,541, filed by Albert J. Williams, Jr., and entitled "Pulse Amplifier System for Spectrographic Analysis," now Patent No. 2,638,811. More particularly, a spectrometer 10, which may be of conventional type including synchronous shutters and drives therefor (not shown), is provided with an entrance slit 11 through which radiation, as by an arc or a spark indicated by the source 12, passes to a collimating mirror 13 which directs the radiation to a diffraction grating 14. From the spectrum produced by the grating 14 a line produced by an element of the excited specimen is selected by the positioning of an exit slit 15 with respect to the grating 14 for passage to a radiation receiver, such as a phototube or photomultiplier tube 16. A second phototube 17 is arranged to receive radiation from a reference line of the spectrum or directly from the source 12. The output current of the phototube 16 is a function of the line intensity which, in turn, depends upon the amount of the corresponding element present in the specimen. As explained in a paper entitled "Electronically Balanced Recorders for Flight Testing and Spectroscopy" by Albert J. Williams, Jr. et al., which appears in A. I. E. E. Transactions, vol. 65, 1946, pages 205–208, and in Patent No. 2,522,976 to Albert J. Williams, Jr., the radiation-responsive devices such as 16 and 17 are preferably photomultipliers. A ratio recorder 18 is illustrated as having one input circuit 19 from phototube 17 and a second input circuit 20 from phototube 16.

Figure 3:
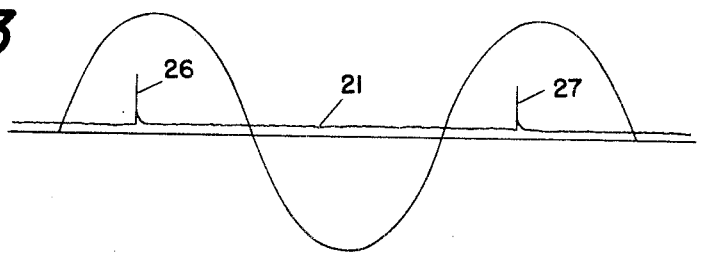

Because of the "dark current," that is, the current flow during the absence of an output from the radiation source 12, as shown at 21 of Fig. 3, alternating-current amplifiers are required to improve the signal-to-noise ratio. The signal is representative of the intensity of the respective spectrum lines and the noise is represented by "dark current." As described in said application and as shown in Fig. 1 of the present application, the modulated output of each of the photocells or photomultiplier tubes 16, 17 is respectively applied to alternating-current amplifiers 22 and 23, and the respective outputs thereof are rectified as by vibrators or synchronous rectifiers 24 and 25.

Figure 4:
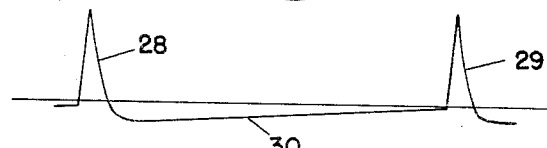
Figure 5:
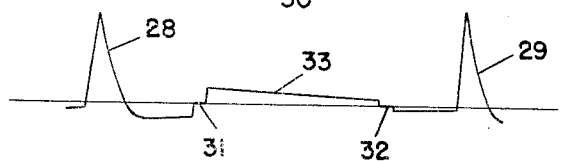

The requirements of a satisfactory amplifier are fully set forth in said Patent No. 2,638,811, particularly as regards time constants. When sharp pulses are applied to such amplifiers, such as the pulses 26 and 27 of Fig. 3, there will appear in the output circuit amplified pulses such as 28 and 29 as shown in Fig. 4 interconnected by the upwardly inclined negative half-cycle 30 of the amplifier signal. If a synchronous rectifier, such as rectifier 24 or 25, operates to reverse the output connections on either side of the open-circuit positions 31 and 32 of Fig. 5, there will, of course, be a reversal of polarity of the intermediate portion 33 of the negative output signal, and the amplitude will decrease in the manner illustrated. Should the phase of the synchronous rectifier change; that is, should there be a change in the time of opening, the time of closing, or the duration-time that the contacts are in open or closed position, it will be seen that the regions 31 and 32, illustrative of the time-occurrence of the circuit-changing operations, will be moved to the left or to the right of the positions illustrated in Fig. 5. Thus, with each change in phase a change in the included area below the portion of the signal represented at 33 will result in a change in the output signal of the amplifier-rectifier combination due solely to the change of said included area. Such a change in the output signal would cause the ratio recorder to respond as through a change had occurred in the intensity of the spectral line, and erroneous measuring results would appear.

In accordance with the present invention, the synchronous rectifiers 24 and 25, of any suitable type, are operated so that in their operation phase shift does not occur, and the errors described above do not appear. The better to understand the present invention, reference may be had to one form of vibrator diagrammatically illustrated in Fig. 2 and disclosed and claimed in co-pending application Serial No. 725,465, filed by Albert J. Williams, Jr., and Raymond E. Tarpley, now Patent No. 2,614,188. The vibrator 24, for example, may comprise an energizing coil 34 having a magnetizable core 35 with an enclosing housing 36 with opposite ends disposed in spaced relation to the upper end of a reed 37 supported at its lower end on a member 38. The upper end of the reed 37 preferably has supported thereon a permanent magnet 39 in the form of a disc having a diametral slot which in the neutral position of reed 37 is in alignment with the reduced end portion of the core 35. When the coil 34 is energized from alternating current, the reed 37 will be moved to the right or the left depending upon the polarity.

When a positive half-cycle flows through the coil 34 one end of the core 35 will be "north" and the other end will be "south." Depending upon the polarity of the two sides of the disc magnet 39 and that of coil 34, the reed 37 will be deflected to the right or to the left as viewed in Fig. 2. When the coil 34 is energized by the negative half-cycle the force upon the reed 37 will reverse. Thus, the reed 37 will be positively driven by the alternating current first to the right and then to the left. For a 60-cycle alternating current the reed will vibrate at the rate of 60 cycles per second. When the reed 37 is moved to the right, a protuberance or push rod 40 moves away from resilient contact arm 41 to move its associated contact toward and into engagement with the relatively stationary contact carried by a resilient arm 42. The arm 42 abuts against a stop formed by an extension of a stationary support 43 to predetermine the instant of opening of the circuit as between conductors 44 and 45, and likewise to predetermine the instant of closure upon movement of the push rod 40 toward the right. The circuit between conductors 46 and 47 is similarly controlled by the movement of contact arms 48 and 49 of like construction with arms 41 and 42 and their associated structure.

Referring now to Fig. 1, it will be seen that the vibrator 24 has conductors 45 and 47 connected together. They form one side of the input circuit to the ratio recorder, while conductors 44 and 46 are connected to the extremities of the secondary winding of an output transformer 50 of amplifier 22, a midtap to that winding forming the other side of the input circuit 19 of the ratio recorder 18. The vibrator 25, identical with vibrator 24, has been illustrated with the same reference characters and the added subscript "a." The respective actuating coils 34 and 34a are energized from the secondary winding of a transformer 51, the primary winding of which is connected in series-circuit relation with a control tube 52, a resistor 53, and a regulated source of direct current 54. The control tube 52 is preferably of the thermionic type and provided with an anode, a control grid and cathode. The grid-cathode circuit is connected to any suitable source of alternating-current supply, the usual commercial source being indicated by supply terminals 56 and 57. Included in the grid circuit is a resistor 58 having a resistance value large compared with the grid-to-cathode resistance of tube 52 which exists during a positive half-cycle of signal applied thereto. For a tube of the 12AU7 type the grid-cathode resistance will be approximately 1,000 ohms for positive half-cycles and, hence, the resistor 58 may have a value of the order of 1 megohm. The resistor 58 is made high in order to provide grid-limiting operation. The positive peaks will be "clipped" or limited in magnitude to a value not much more than 0.1 volt, though the voltage during the positive half-cycle changes from 0 to 110-125 volts. The resistor 53 in the plate or output circuit of tube 52 may be of the order of 2,000 ohms, and thus provides plate cut-off operation of tube 52. A resistor 60 and a capacitor 61 provide for phase adjustment in order that the time at which the opening and closure of the contacts of vibrators 24 and 25 occurs may be electrically adjusted or determined. Though resistor 60 and capacitor 61 have been shown adjustable, in general their values will be determined as a factory adjustment and in a typical embodiment may be respectively .5 megohm and 0.005 microfarad.

Figure 7:
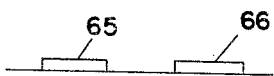

From the foregoing explanation, it will be seen that as positive pulses of alternating current are applied to the input or grid-cathode circuit of tube 52 the current through the primary winding of transformer 51 is a maximum. For negative half-cycles of alternating current the current flow through the primary winding of transformer 51 is essentially zero. Thus as shown in Fig. 7, from the regulated source 54 of direct current there are produced in the primary winding of transformer 51 a series of pulses 65 and 66 of uniform amplitude. These are converted by transformer 51 into alternating current as indicated by the graph 67 of Fig. 8, a capacitor 68 being connected across the secondary winding for wave-shaping purposes. By reason of the fact that the source 54 is voltage-regulated, a matter of ease and convenience with direct current, and by reason of the fact that only 10 volts at the grid is required to produce the pulses 65 and 66 of Fig. 7, it has been found that the vibrators 24 and 25 operate in avoidance of phase shift or change in their timing though the voltage of the alternating-current source may vary in great degree.

The transformer 51 also serves the important purpose of eliminating direct current from the driving coils 34 and 34a. Any direct current in the operating coils would, of course, affect the position of the reed 37 due to the resultant field produced by the coil 34 on the magnet 39. By eliminating the direct-current component from the driving coil circuit entirely, this effect is eliminated and there is also avoided the resultant change in operation of the vibrator which would be present with a changing direct-current component in coil 34. In this connection it is to be noted that the invention is applicable to vibrators with a single pair of contacts as well as to vibrators having more than two pairs of contacts operated by a single reed.

Figure 8:
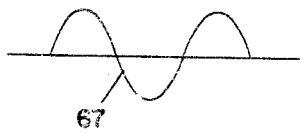

It has also been found that by using the direct-current pulses of duration coinciding with the beginning and end of each half-cycle of current flowing through the primary winding of transformer 51, there can be produced in the secondary winding thereof, after shaping by the capacitor 68, a substantially sinusoidal alternating current, such as shown by the graph 67 of Fig. 8. Since the wave form approaches that of the pure sine wave, there is avoided high-frequency components which have in the past given trouble by capacitive transfer into the circuits under control.

Figure 6:
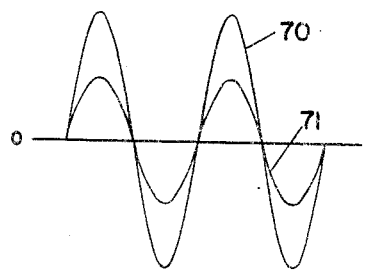

As shown in Fig. 6, the alternating-current voltage variations may change from an amplitude as indicated by graph 70 to an amplitude as indicated by the graph 71, about one-half as great. The respective half-cycles of both curves begin at the same instant and end simultaneously at the same later instant. However, the voltage represented by curve 71 reaches a maximum some time after the voltage represented by curve 70 has attained a value equal to that maximum. The time-difference decreases as lower magnitudes of voltage on the two curves are compared. Advantage is taken of this fact by employing the amplifying-control stage including tube 52 whose conductivity can be made high by voltages of small magnitude. For example, a control voltage of about ten volts or less may be used from a source of 110-volt alternating current. The fraction used is small enough to make negligible phase shift in operation of the vibrators or circuit-making and breaking devices 24 and 25. In addition to elimination of phase shift of the foregoing type, there is achieved almost complete suppression of transients, such as peak voltages, which may occur for example as a result of sudden load changes on the source of alternating-current supply. The peaks and transients have little effect on tube 52 since it is normally operated first under grid cut-off and then under anode current-saturation conditions.

It is again emphasized the vibrator diagrammatically shown in Fig. 2 may be of any suitable type, and in some cases the vibrator will be provided with normally closed contacts instead of the normally open contacts which have been illustrated. Other changes in structural features may be made, and some changes may be made in the circuits themselves, still retaining the features of the invention above set forth. The regulated source of direct current may be of any conventional type, such as illustrated in the "Radio Engineers' Handbook" by Terman, First Edition, 1943, at page 615, or one of the several circuits appearing in "Electronics: Experimental Techniques" by W. C. Elmore et al., First Edition, 1949, page 363 et seq. and particularly the circuits appearing at pages 373, 375 and 376. It has not been deemed necessary to illustrate these circuits in detail since they are fully presented in the foregoing references together with descriptions of their operation.

Unidirectional pulses of equal length, such as shown in Fig. 7, may be used as the control signal for tube 52 instead of alternating current. A cascade connection may also be employed where the output of transformer 51 would comprise the source of control voltage to the second stage at input terminals corresponding with terminals 56 and 57. A second tube and output transformer connected as tube 52 with the regulated source of direct current would be used. The several stages may be cascaded as desired, each additional stage further decreasing phase shift.

While a preferred embodiment of the invention has been described, it is to be understood further modifications may be made within the scope of the appended claims.

What is claimed is:

1. The combination with a circuit-making and breaking device of the type having at least one contact movable relative to a second contact to make and break an electrical circuit and an operating coil for said device for operating said movable contact periodically to make and break said circuit, of a voltage-regulated source of direct current, control means in circuit with said voltage-regulated source for producing spaced pulses of direct current of constant amplitude, means included in the circuit between said source and said control means for energizing said coil with pulses of current of constant amplitude, said control means including connections to an unregulated source of alternating current, and means for operating said control means in accordance with the periodicity of said alternating current unaffected by varying amplitude thereof.

2. A driving system for a circuit-making and breaking device of the type having at least one contact movable relative to a second contact to make and break an electrical circuit and a coil for actuating said device for movement of said contact periodically to make and break said circuit, comprising a voltage-regulated source of direct current, control means in circuit with said voltage-regulated source for producing pulses of current of constant amplitude, means including circuit connections for applying said pulses to said coil, and means connecting said control means to an unregulated source of alternating current for actuating said control means to produce said pulses in accordance with the periodicity of said alternating current and unaffected by change in amplitude of said alternating current.

3. In combination a vibrator having an electromagnetic coil for operating the same, a voltage-regulated source of direct current, an unregulated source of alternating current, connections for energizing said coil from said regulated source, and a control device in circuit with said source of direct current actuated solely in accordance with the periodicity of the unregulated alternating-current source and unaffected by change in amplitude thereof for supplying pulses of uniform amplitude for the energization of said coil.

4. A system of operating a circuit-making and breaking device of the type having at least one contact movable relatively to a second contact to make and break an electrical circuit at a predetermined frequency and a coil for actuating said device to move said contact periodically to make and break said circuit, comprising means for maintaining uniform periodic energization of said coil at said frequency comprising a voltage-regulated source of direct current, an electric valve connected to said source, a control circuit for said valve supplied from an unregulated source of alternating current of said predetermined frequency, electrical circuit components for developing from a small fraction of the voltage of said applied alternating current uniformly spaced pulses of current of constant amplitude supplied by said regulated source, means for transforming said supplied pulses to substantially sinusoidal alternating current of constant amplitude and of said predetermined frequency, and circuit connections for applying said constant amplitude alternating current to said coil.

5. A system of maintaining constant with respect to an unregulated source of alternating current the phase of a vibrator having an actuating coil, which comprises means applying to said coil from a voltage-regulated source of direct current pulses of electrical energy, and means for spacing said pulses in accordance with the periodicity of said unregulated source of alternating current.

6. The combination with a vibrator having an operating coil, of a voltage-regulated source of direct current, circuit connections for energizing said coil from said regulated source, an electric valve in circuit with said regulated source for controlling application of said pulses of electrical energy to said coil, a control circuit for said valve connected to an unregulated source of alternating current, said control circuit having circuit components for rendering said valve respectively conductive and nonconductive in response to fractions of succeeding positive and negative half-cycles of said alternating current which are quite small as compared with the amplitude of said half-cycles.

7. The combination set forth in claim 6 in which said fraction is of the order of ten per cent.

8. The method of operating vibrators in avoidance of phase shift due to a changing amplitude of the voltage applied to the driving coil thereof which comprises producing pulses from a voltage-regulated source of direct current, and controlling the rate of production of said pulses in accordance with the frequency of an unregulated source of alternating current.

9. A system of operating vibrators in avoidance of phase shift due to a changing amplitude of voltage applied to the driving coil thereof which comprises means for producing from a voltage-regulated source of direct current pulses of uniform amplitude, and means for regulating the production of said pulses in accordance with a small first-appearing voltage of like half-waves which is a small fraction of the maximum voltage of like half-waves of an unregulated source of alternating current, and means for applying pulses of uniform amplitude to the driving coil of said vibrator.

10. The method of operating vibrators in avoidance of phase shift due to a changing amplitude of the voltage applied to the driving coil thereof which comprises producing from a voltage-regulated source of direct current pulses of uniform amplitude, regulating the production of said pulses in accordance with a small first-appearing voltage of each half-wave which is a small fraction of the maximum voltage of each half-wave of an unregulated source of alternating current, the duration of time of current flow of each said pulse coinciding with the beginning and end of each half-cycle of voltage from the unregulated source of alternating current, and applying said pulses of uniform amplitude to the driving coil of said vibrator.

11. The method of periodically making and breaking a circuit with substantially constant time durations of circuit-making and of circuit-breaking which comprises passing direct-current pulses from a voltage-regulated source through a control circuit, controlling the beginning and end of each pulse to coincide with the beginning and end of like half-cycles of voltage of an unregulated source of current, transforming said pulses into alternating current, shaping the transformed pulses into a substantially pure sine wave, and controlling the making and breaking of the circuit in accordance with said shaped sine wave.

12. The combination with a vibrator having an operating coil, of a voltage-regulated source of direct current, circuit connections for energizing said coil from said regulated source, a control circuit between said coil and said source including a control device having a unidirectional current-carrying characteristic, an unregulated source of alternating current, means for applying from said unregulated source of alternating current a control signal to said control circuit for production of a pulse from said regulated source when said alternating current from said unregulated source is changing at maximum rate and in the region where it passes through zero.

13. The combination with a vibrator having an operating coil, of a voltage-regulated source of direct current connected to said coil, a transformer having a secondary winding and a primary winding, circuit connections for energizing said primary winding from said regulated source, a control circuit between said coil and said source including a unidirectional current-carrying means, an unregulated source of alternating current, circuit connections between said unregulated source and said control circuit including unidirectional current-carrying means for flow of pulses of one polarity and for preventing flow of pulses of the opposite polarity for developing from said unregulated source of alternating current a control signal for production by said control circuit of pulses from said regulated source when said alternating current from said unregulated source is changing at a maximum rate and in the region where its amplitude passes through zero, at least a part of said control circuit being in series-circuit relation with both of said sources, said control circuit and said unidirectional means initiating and terminating said pulses at times when there is applied to said control circuit but a small fraction of the maximum values of alternating current from said unregulated source.

References Cited in the file of this patent

UNITED STATES PATENTS

| Number | Name | Date |
|---|---|---|
| 2,292,630 | Garstang | Aug. 11, 1942 |